United States Patent
Lin

(10) Patent No.: US 9,332,495 B2
(45) Date of Patent: May 3, 2016

(54) METHOD AND DEVICE OF SUPPORTING ARBITRARY REPLACEMENT OF MULTIPLE DATA UNITS

(75) Inventor: Wenqiong Lin, Shenzhen (CN)

(73) Assignees: ZTE Corporation, Shenzhen, Guangdong (CN); ZTE Microelectronics Technology Co., Ltd., Shenzhen (CN)

(*) Notice: Subject to any disclaimer, the term of this patent is extended or adjusted under 35 U.S.C. 154(b) by 118 days.

(21) Appl. No.: 14/008,562

(22) PCT Filed: Nov. 25, 2011

(86) PCT No.: PCT/CN2011/082944
§ 371 (c)(1),
(2), (4) Date: Sep. 29, 2013

(87) PCT Pub. No.: WO2012/136065
PCT Pub. Date: Oct. 11, 2012

(65) Prior Publication Data
US 2014/0022971 A1    Jan. 23, 2014

(30) Foreign Application Priority Data
Apr. 7, 2011 (CN) .......................... 2011 1 0086318

(51) Int. Cl.
*H04W 52/02* (2009.01)
*G06F 15/78* (2006.01)
*H04B 1/00* (2006.01)

(52) U.S. Cl.
CPC ....... *H04W 52/0209* (2013.01); *G06F 15/7807* (2013.01); *H04B 1/0003* (2013.01); *Y02B 60/1207* (2013.01); *Y02B 60/1225* (2013.01)

(58) Field of Classification Search
None
See application file for complete search history.

(56) References Cited

U.S. PATENT DOCUMENTS

| 4,078,260 | A  | * | 3/1978 | Chen et al. ................. 707/611 |
| 6,622,242 | B1 | * | 9/2003 | Steele, Jr. ................... 712/300 |
| 6,731,636 | B1 | * | 5/2004 | Ikematsu ................... 370/395.1 |
| 2003/0009642 | A1 | | 1/2003 | Takeshita |

(Continued)

FOREIGN PATENT DOCUMENTS

| CN | 1558588 A | 12/2004 |
| CN | 101453292 A | 6/2009 |
| CN | 101874354 A | 10/2010 |
| JP | 2011023975 A | 2/2011 |
| WO | 2007015941 A2 | 2/2007 |

OTHER PUBLICATIONS

International Search Report in international application No. PCT/CN2011/082944, mailed on Mar. 8, 2012. (2 pages—see entire document).
English Translation of the Written Opinion of the International Search Authority in international application No. PCT/CN2011/082944, mailed on Mar. 8, 2012. (5 pages—see entire document).

*Primary Examiner* — Dang Ton
*Assistant Examiner* — Ronald h Davis
(74) *Attorney, Agent, or Firm* — Oppedahl Patent Law Firm LLC

(57) ABSTRACT

The disclosure discloses a method of supporting arbitrary replacement of multiple data units, which includes: configuring patterns for arbitrary position replacement of N data units; and during a process of data unit replacement, performing a replacement operation on the N data units according to the configured patterns. The disclosure further discloses a device of supporting arbitrary replacement of multiple data units. By means of the method and device, an occupied area of a data unit replacement circuit in a chip can be decreased, and power consumption can be reduced.

7 Claims, 5 Drawing Sheets

(56) References Cited

U.S. PATENT DOCUMENTS

| | | | |
|---|---|---|---|
| 2004/0054878 A1* | 3/2004 | Debes et al. | 712/221 |
| 2004/0088476 A1* | 5/2004 | Abdat | 711/108 |
| 2007/0027888 A1 | 2/2007 | Avergun et al. | |
| 2009/0106525 A1 | 4/2009 | Luick et al. | |
| 2009/0138668 A1 | 5/2009 | Blankenship | |
| 2009/0254718 A1 | 10/2009 | Biscondi et al. | |
| 2010/0027547 A1* | 2/2010 | Shinozaki | 370/394 |
| 2010/0122064 A1 | 5/2010 | Vorbach | |

* cited by examiner

METHOD AND DEVICE OF SUPPORTING ARBITRARY REPLACEMENT OF MULTIPLE DATA UNITS

TECHNICAL FIELD

The disclosure relates to the field of a vector processor in a chip design, and in particular to a method and device of supporting arbitrary replacement of multiple data units.

BACKGROUND

At present, a communication protocol includes multiple modes such as a Global System for Mobile Communications (GSM), a Universal Mobile Telecommunications System (UMTS), a Wireless Local Area Network (WLAN), Time Division-Synchronization Code Division Multiple Access (TD-SCDMA), and Long Term Evolution (LTE). If an Application Specific Integrated Circuit (ASIC) method is adopted to achieve a chip of a multimode compatible mobile terminal, the obtained chip will has drawbacks such as a large chip area, high power consumption, and lack of flexibility. A currently proposed Software-Defined Radio (SDR) technique is a great potential technique for solving the problem for the chip design of the multimode compatible mobile terminal, and a programmable vector processor is core architecture of the SDR.

In order to support processing of a multimode base band, it is required that a vector processor must be able to perform several G times of operations each second. The number of data units processed by the vector processor each time is very large and is generally 8, 16 or 32. One data unit is 32 bits, which represents a pair of iq floating point data. In order to process these vector data flexibly, arbitrary position replacement of data units within the vector processor is an essential operation.

A solution of arbitrary position replacement of data units proposed in the prior art is shown in FIG. 1. In order to implement position replacement of 32 data units, 32 32-to-1 selectors are required. In FIG. 1, in0, in1, . . . , and in31 denote 32 data units to be performed position replacement, and out0, out1, . . . , and out31 denote a result of position replacement of the 32 data units. The 32 data units need to be input into 32 32-to-1 selectors respectively, each of the 32-to-1 selectors selects one data unit from the input 32 data units, and 32 data units after position replacement are finally obtained. If the 32-to-1 selectors are converted into 2-to-1 selectors, then the method requires 32×31 (=992) 2-to-1 selectors. Although this method can implement arbitrary position replacement of data units, it can be seen that the number of selectors used by an implementation procedure thereof is very large, such that an occupied area of a data unit replacement circuit in a chip is very large and power consumption is also very high.

SUMMARY

In view of this, a main purpose of the disclosure is to provide a method and device of supporting arbitrary replacement of multiple data units, which can decrease an occupied area of a data unit replacement circuit in a chip and can reduce power consumption.

In order to achieve the above purpose, the technical solution of the disclosure is implemented as follows.

The disclosure provides a method of supporting arbitrary replacement of multiple data units, which includes configuring patterns for arbitrary position replacement of N data units. The method further includes:

during a process of data unit replacement, performing a replacement operation on the N data units according to the configured patterns;

wherein N denotes a number of the data units and is equal to $2^m$, and the m is a positive integer.

Preferably, when N is 32, the method may include:

configuring patterns for arbitrary position replacement of 32 data units; and during a process of data unit replacement, performing the following replacement operations successively on the 32 data units according to the configured patterns: a replacement operation of four data units, a replacement operation of eight data units, a replacement operation of 16 data units, and a replacement operation of 32 data units.

Preferably, the configured patterns may include: a configuration of control lines corresponding to cross selectors, which is for controlling a replacement operation of two data units during a process of replacement.

Preferably, the step of performing a replacement operation of four data units on the 32 data units may include:

dividing the 32 data units into eight groups, wherein each group includes four data units; and performing a replacement operation on the four data units of the respective group respectively.

Preferably, the step of performing a replacement operation of eight data units on the 32 data units may include:

performing a pairwise combination on eight groups of data units on which the replacement operation of four data units is performed, to generate four groups of sequences of eight data units; and performing the replacement operation of eight data units on the four groups of data unit sequences respectively according to the configured patterns.

Preferably, the step of performing a replacement operation of 16 data units on the 32 data units may include:

performing a pairwise combination on four groups of data units on which the replacement operation of eight data units is performed, to generate two groups of sequences of 16 data units; and performing the replacement operation of 16 data units on the two groups of data unit sequences respectively according to the configured patterns.

Preferably, the step of performing a replacement operation of 32 data units on the 32 data units may include:

combining two groups of data units on which the replacement operation of 16 data units is performed, to generate one group of a 32 data unit sequence; and performing the replacement operation of 32 data units on the group of data unit sequence according to the configured patterns.

The disclosure further provides a device of supporting arbitrary replacement of multiple data units, which includes a configuring module and a replacement processing module, wherein the configuring module is configured to configure patterns for arbitrary position replacement of N data units; and the replacement processing module is configured to, during a process of data unit replacement, perform a replacement operation on the N data units according to the patterns configured by the configuring module;

wherein N denotes a number of the data units and is equal to $2^m$, and m is a positive integer.

Preferably, when N is 32, the configuring module may be configured to configure patterns for arbitrary position replacement of 32 data units; and the replacement processing module is configured to, during a process of data unit replacement, perform the following replacement operations successively on the 32 data units according to the patterns configured by the configuring module: a replacement operation of four data units, a replacement operation of eight data units, a replacement operation of 16 data units, and a replacement operation of 32 data units.

Preferably, the replacement processing module may further include: a four data unit replacement module, an eight data unit replacement module, a 16 data unit replacement module, and a 32 data unit replacement module, wherein the four data unit replacement module is configured to perform the replacement operation of four data units on the 32 data units according to the patterns configured by the configuring module, and send a replacement result to the eight data unit replacement module;

the eight data unit replacement module is configured to perform the replacement operation of eight data units on 32 data units sent by the four data unit replacement module according to the patterns configured by the configuring module, and send a replacement result to the 16 data unit replacement module;

the 16 data unit replacement module is configured to perform the replacement operation of 16 data units on 32 data units sent by the eight data unit replacement module according to the patterns configured by the configuring module, and send a replacement result to the 32 data unit replacement module; and the 32 data unit replacement module is configured to perform the replacement operation of 32 data units on 32 data units sent by the 16 data unit replacement module according to the patterns configured by the configuring module.

According to the method and device of supporting arbitrary replacement of multiple data units provided by the disclosure, patterns for arbitrary position replacement of N data units are configured; and during a process of data unit replacement, a replacement operation is performed on the N data units according to the configured patterns. When the method of the disclosure is applied to perform an operation of arbitrary replacement on 32 data units, 15 orders of exchanging operations are performed, and 382 2-to-1 selectors are required. The number of 2-to-1 selectors required by the disclosure is much less than that required in the prior art, which is 992. Therefore, the disclosure can decrease an occupied area of a data unit replacement circuit in a chip, and power consumption can also be reduced correspondingly due to the decrease of the occupied area of the circuit.

Furthermore, the replacement operation of the disclosure needs only two clock cycles, which is very quick.

DETAILED DESCRIPTION

The basic idea of the disclosure is: patterns for arbitrary position replacement of N data units are configured; and during a process of data unit replacement, a replacement operation is performed on the N data units according to the configured patterns.

The N denotes the number of the data units and is equal to $2^m$, and the m is a positive integer. Taking 32 data units as an example, during a process of data unit replacement, a replacement operation of four data units, a replacement operation of eight data units, a replacement operation of 16 data units and a replacement operation of 32 data units is performed on the 32 data units successively according to the configured patterns.

The patterns are: parameters corresponding to final positions obtained after position replacement of data units of an input vector processor. For example, assuming that four data units e0, e1, e2, and e3 are input from left to right, a position sequence to be output is e3, e0, e1, and e2, then the values of parameters p0, p1, p2, and p3 of patterns are configured as 1, 2, 3, and 0 respectively. Of course, the patterns further include cross selectors required for data exchanging, i.e., a configuration of control lines corresponding to 2-to-1 selectors.

The disclosure is described by taking 32 data units as an example. However, the solution of the disclosure is not limited to arbitrary position replacement of 32 data units, but can also apply to arbitrary replacement of 64 or more data units. Of course, the disclosure supports arbitrary replacement of 4, 8 and 16 data units, and a specific implementation method of the disclosure is described below.

The disclosure is further elaborated below with reference to the drawings and specific embodiments.

Figure 1:
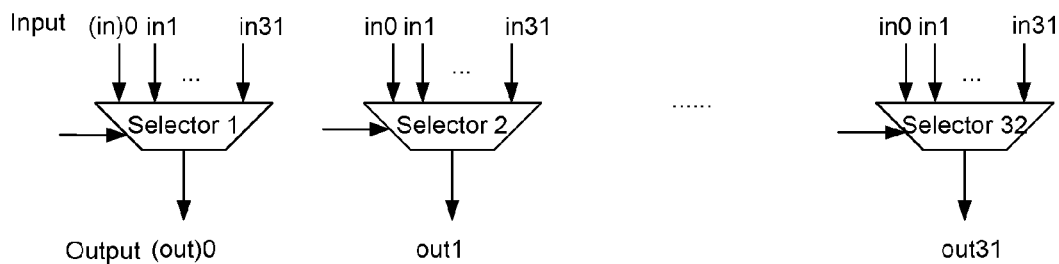
FIG. 1 is a schematic diagram of implementation of a method of supporting arbitrary replacement of 32 data units in the prior art.
Figure 2:
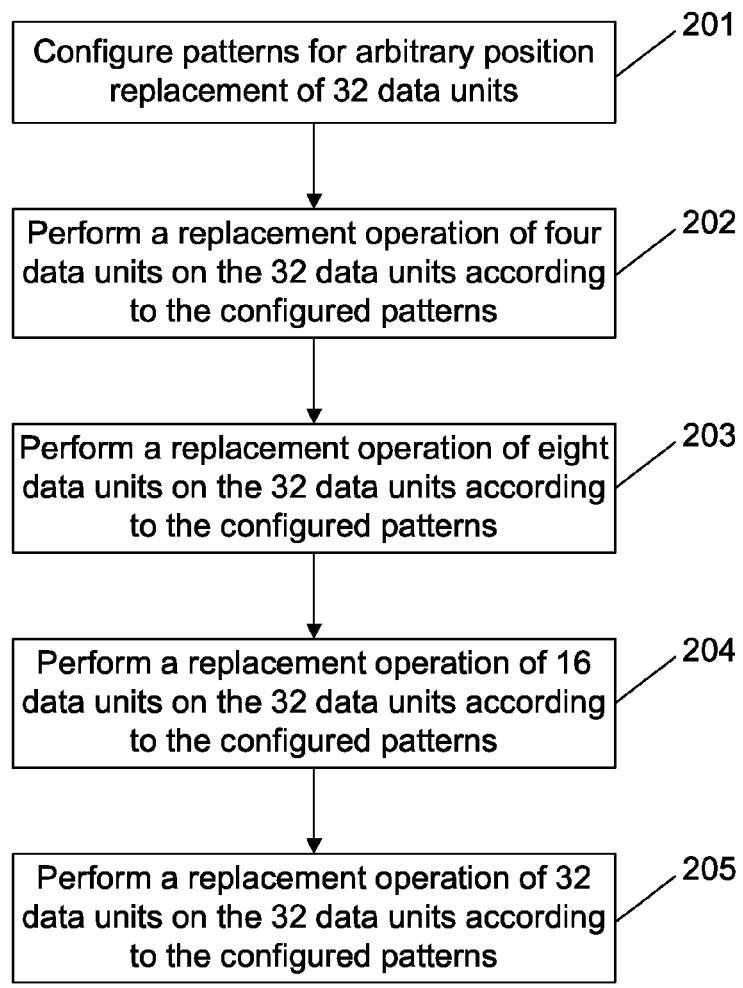
FIG. 2 is a schematic flowchart of implementing a method of supporting arbitrary replacement of 32 data units according to an embodiment of the disclosure.

FIG. 2 is a schematic flowchart of implementing a method of supporting arbitrary replacement of 32 data units according to an embodiment of the disclosure. As shown in FIG. 2, an implementation flow of the method includes:

Step 201: Patterns for arbitrary position replacement of 32 data units are configured.

Specifically, the patterns for arbitrary replacement of 32 data units are configured according to an actual need, that is, a configuration is performed according to a required final result obtained from position replacement of 32 data units.

Figure 3:
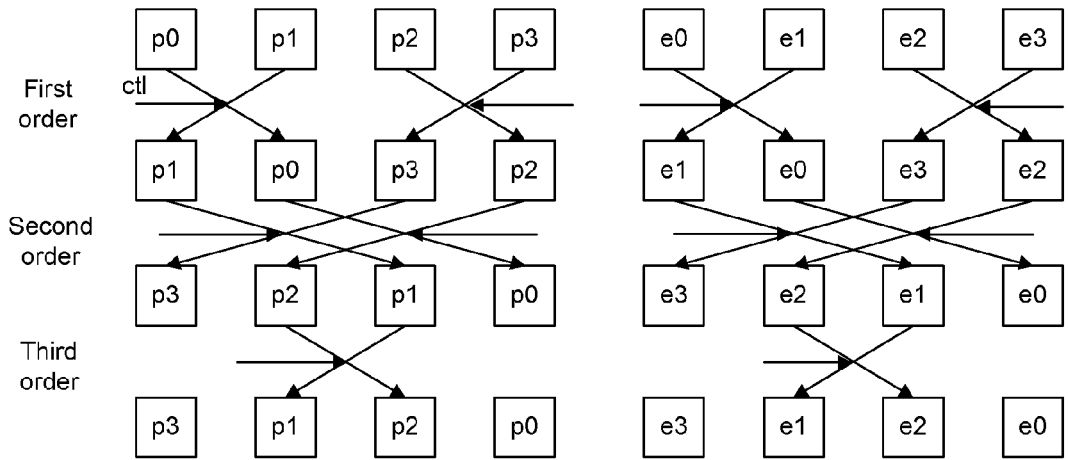
FIG. 3 is a schematic flowchart of sorting four data units in terms of patterns according to an embodiment of the disclosure.

For example, taking four data units as an example, assuming that four data units in an input vector processor need to be replaced from a position sequence of e0, e1, e2, and e3 to a position sequence of e3, e1, e2, and e0, when patterns are configured, it is assumed that four initial parameters corresponding to the patterns are denoted by p0, p1, p2, and p3, and values corresponding to the four initial parameters are set as 3, 1, 2, and 0 respectively, that is, the patterns are configured according to output positions of input data. The values 3, 1, 2, and 0 are performed pairwise comparison and are sorted in ascending order, and a finally obtained result must be 0, 1, 2, and 3. When pairwise comparison is performed, a control line ctl corresponding to each cross selector is generated. It can assumed that when ctl=1, it is represented that positions of two data are exchanged, and that when ctl=0, it is represented that positions of two data are invariable. As shown in FIG. 3, the left side of FIG. 3 represents replacement patterns, and the right side of FIG. 3 is a flow of position replacement of data units input into a vector processor actually, wherein all horizontal arrows represent control lines. Sorting of left four parameters p0=3, p1=1, p2=2, and p3=0 needs to perform exchanging of three orders. During sorting of the first order, because p0>p1 and p2>p3, control lines corresponding to cross selectors are ctl=1 and ctl=1 respectively. During sorting of the second order, because p1>p3 and p0>p2, control lines corresponding to cross selectors are ctl=1 and ctl=1 respectively. During sorting of the third order, because p2>p1, a control line corresponding to a cross selector is ctl=1. Therefore, when actually input four data units e0, e1, e2, and e3 are performed position replacement, exchanging of each order will be performed under the control of control lines generated according to left patterns, and an obtained result is shown as the right side of FIG. 3.

A method for configuring patterns for arbitrary position replacement of 32 data units is the same as the method for configuring patterns for arbitrary position replacement of the above four data units, which is mainly to configure control lines of respective cross selectors, for controlling a position replacement operation of two data units during a process of replacement. Position replacement of 32 data units is divided into four steps, and each of the steps corresponds to corresponding patterns. Specific patterns are not elaborated here, which can be referred to flowcharts of replacing data units in subsequent steps.

Step 202: A replacement operation of four data units is performed on the 32 data units according to the configured patterns.

Specifically, the 32 data units are divided into eight groups first, and each group includes four data units. A replacement operation is performed on the four data units of each group respectively. For example, assuming that the 32 data units are a0, a1, a2, . . . , and a31 respectively, each four data units are divided into a group in sequence, and the first group includes a0, a1, a2, and a3. According to the configured patterns, i.e., under the control of control lines of cross selectors in the patterns, positions of two data is interchanged to complete the replacement operation for the a0, a1, a2, and a3. Replacement operations of other seven groups are performed in the same way.

Figure 4:
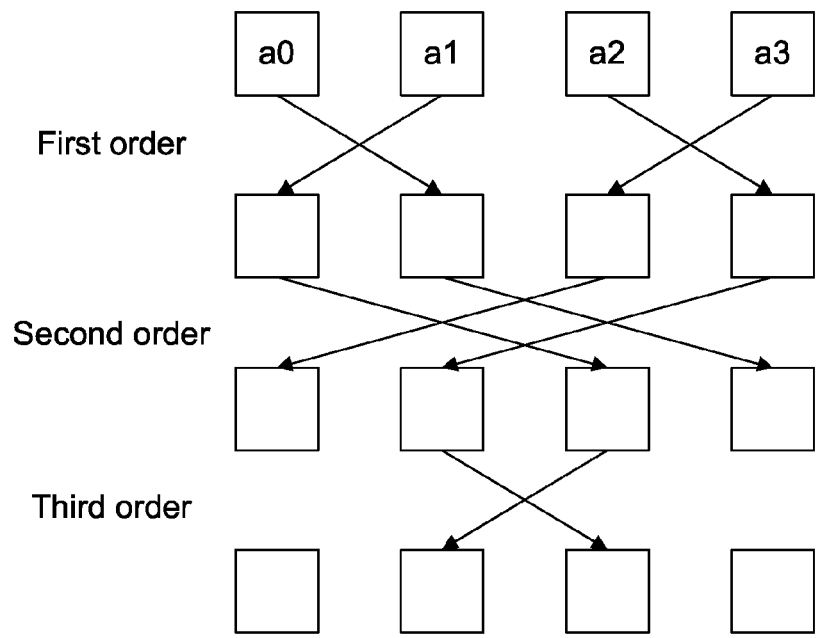
FIG. 4 is a flowchart of performing position replacement of four data units according to an embodiment of the disclosure.

FIG. 4 is a flowchart of performing position replacement of four data units according to an embodiment of the disclosure. As shown in FIG. 4, replacement of four data units requires exchanging operations of three orders, and an exchanging operation between two data units is controlled by control lines of a cross selector in corresponding patterns, i.e., control lines of a 2-to-1 selector. It can also be seen from FIG. 4 that the position replacement of four data units requires 5×2 cross selectors, i.e., 10 2-to-1 selectors. Then, for eight groups, i.e., 32 data units, 80 2-to-1 selectors are required.

Figure 5:
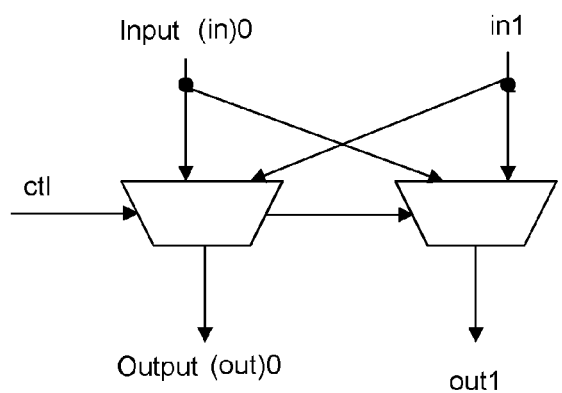
FIG. 5 is a circuit diagram of 2-to-1 selectors corresponding to respective cross lines when performing position replacement of data units according to the disclosure.

FIG. 5 is a circuit diagram of 2-to-1 selectors corresponding to respective cross lines when performing position replacement of data units according to the disclosure. in0 and in1 are two data units before position exchanging, out0 and out1 are two data units after position exchanging, ctl is a control line, and the 2-to-1 selector determines under the control of the control line whether to exchange the positions of the two data units. As shown in FIG. 5, when the positions of the two data units are exchanged, each generated cross line corresponds to two 2-to-1 selectors, so the number of 2-to-1 selectors required in each step can be obtained.

Step 203: The 32 data units are performed a replacement operation of eight data units is performed on the 32 data units according to the configured patterns.

Specifically, the eight data units which two groups have completed the replacement operation of four data units in Step 202 are replaced into a sequence of eight data units according to the patterns. In other words, the eight groups of data units which are performed the replacement operation in Step 202 are performed a pairwise combination to generate four groups of sequences of eight data units, and the replacement operation of eight data units is performed on the four groups of data unit sequences respectively according to the configured patterns.

Figure 6:
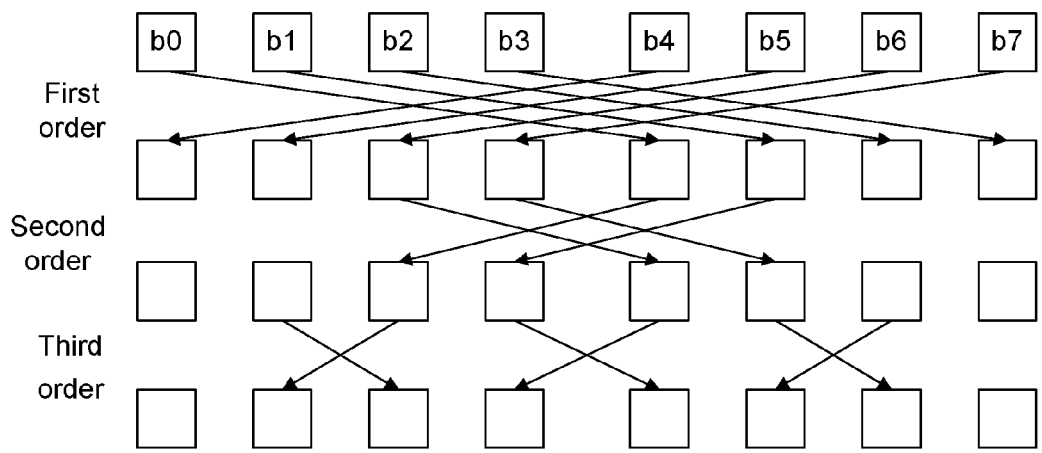
FIG. 6 is a flowchart of performing position replacement of eight data units according to an embodiment of the disclosure.

FIG. 6 is a flowchart of performing position replacement of eight data units according to an embodiment of the disclosure. As shown in FIG. 6, a replacement is performed on data units b0, b1, b2, b3, b4, b5, b6, and b7. Here, the 32 data units are denoted by b0 to b31 so as to distinguish the 32 data units on which no position replacement is performed in Step 202. A result after performing the replacement operation of four data units on 32 data units a0, a1, a2, . . . , and a31 is denoted by b0, b1, b2, . . . , and b31.

It can be seen from FIG. 6 that replacement of eight data units requires exchanging operations of three orders. It can also be seen that the replacement of eight data units requires 9×2 cross selectors, i.e., 18 2-to-1 selectors. Then, for four groups, i.e., 32 data units, 72 2-to-1 selectors are required.

Step 204: A replacement operation of 16 data units is performed on the 32 data units according to the configured patterns.

Specifically, the 16 data units which two groups have completed the replacement operation of eight data units in Step 203 are replaced into a sequence of 16 data units according to the patterns. In other words, the four groups of data units which are performed the replacement operation in Step 203 are performed a pairwise combination to generate two groups of sequences of 16 data units, and the replacement operation of 16 data units is performed according to the configured patterns.

Figure 7:
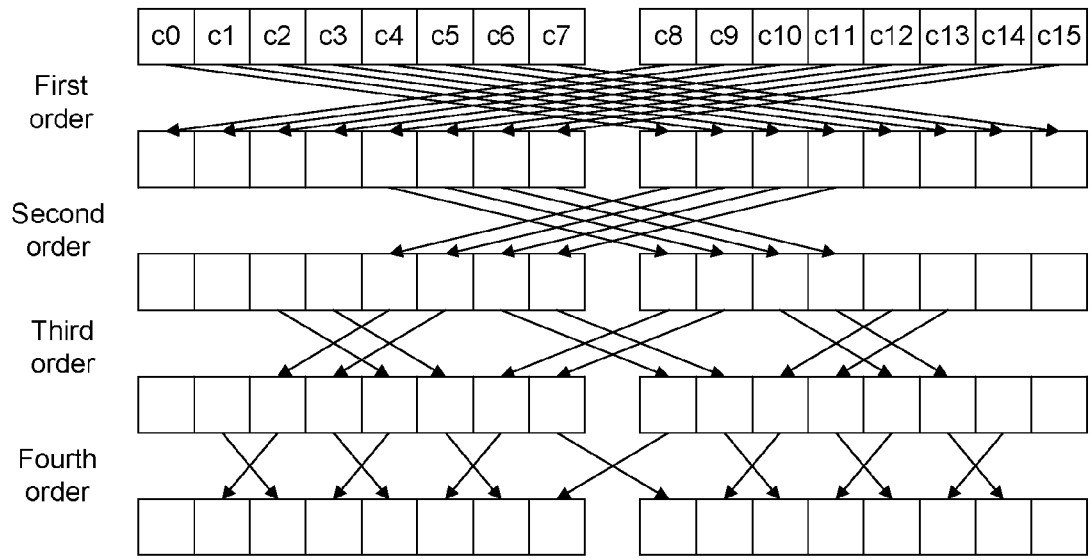
FIG. 7 is a flowchart of performing position replacement of 16 data units according to an embodiment of the disclosure.

FIG. 7 is a flowchart of performing position replacement of 16 data units according to an embodiment of the disclosure. As shown in FIG. 7, a replacement is performed on data units c0, c1, c2, . . . , and c15. Here, the 32 data units are denoted by c0 to c31 so as to distinguish the 32 data units on which the position replacement of eight data units is performed in Step 203, and a result after performing the replacement operation of eight data units on 32 data units b0, b1, b2, . . . , and b31 is denoted by c0, c1, c2, . . . , and c31.

It can be seen from FIG. 7 that replacement of 16 data units requires exchanging operations of four orders. It can also be seen that the replacement of 16 data units requires 25×2 cross selectors, i.e., 50 2-to-1 selectors. Then, for two groups, i.e., 32 data units, 100 2-to-1 selectors are required.

Step 205: A replacement operation of 32 data units is performed on the 32 data units according to the configured patterns.

Specifically, a replacement operation is performed on the 32 data units of two groups on which the replacement operation of 16 data units has been performed in Step 204 to obtain a 32 data unit sequence according to the patterns, that is, the two groups of data units on which the replacement operation is performed in Step 204 are combined to generate one group of a 32 data unit sequence, and the replacement operation of 32 data units is performed according to the configured patterns.

Figure 8:
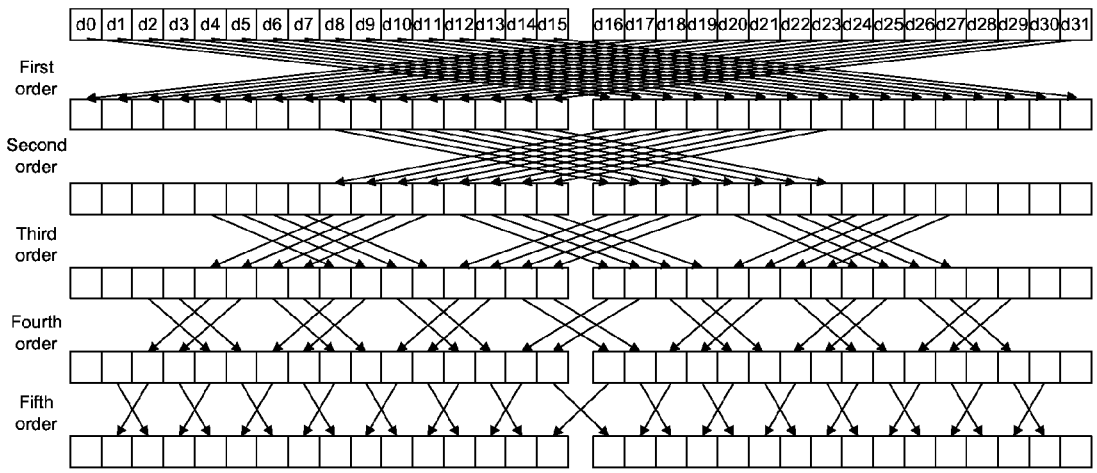
FIG. 8 is a flowchart of performing position replacement of 32 data units according to an embodiment of the disclosure.

FIG. 8 is a flowchart of performing position replacement of 32 data units according to an embodiment of the disclosure. As shown in FIG. 8, an replacement is performed on data units d0, d1, d2, . . . , and d31. Here, the 32 data units are denoted by d0 to d31 so as to distinguish 32 data units on which position replacement of 16 data units is performed in Step 204, and a result after performing the replacement operation of 16 data units on 32 data units c0, c1, c2, . . . , and c31 is denoted by d0, d1, d2, . . . , and d31.

It can be seen from FIG. 8 that replacement of 32 data units requires exchanging operations of five orders. It can also be seen that the replacement of 32 data units requires 65×2 cross selectors, i.e., 130 2-to-1 selectors.

It can be obtained from Steps 202 to 205 that replacement of 32 data units of the disclosure requires 80+72+100+130=382 2-to-1 selectors, and it needs to perform exchanging operations of 3+3+4+5=15 orders during the whole process of replacement. If the replacement is generalized, N data units require exchanging operations of $\log_2 2 + \log_2 4 + \log_2 8 + \ldots + \log_2 N$ orders, in which $N=2^m$, and m is a positive integer.

In addition, in exchanging operations of each order of the disclosure, a time delay of the 2-to-1 selector is about 0.2 ns. If the 2-to-1 selector needs to operate at 500 MHz, then an arbitrary replacement operation of 32 data units needs to take two clock cycles, and is very quick.

Here, for a 2-to-1 selector, a time delay in a TSMC low power consumption library of 65 ns is generally less than 0.2 ns. The disclosure performs exchanging operations of 15 orders, therefore the time delay is 15×0.2=3 ns. Since a clock cycle of 500 MHz is 2 ns, execution time of 3 ns is divided into two cycles, each cycle of which is 1.5 ns. Therefore, the disclosure can be done within two cycles under a clock of 500 MHz.

It can be known from the prior art that, when a replacement operation is performed on 32 data units, an existing implementation method requires 992 2-to-1 selectors, the number of which is much greater than the number of 2-to-1 selectors required by the disclosure. It can be seen that the disclosure can decrease an occupied area of a data unit replacement circuit in a chip and correspondingly reduce power consumption.

The disclosure further discloses a device of supporting arbitrary replacement of multiple data units, which includes a configuring module and a replacement processing module.

The configuring module is configured to configure patterns for arbitrary position replacement of N data units; and the replacement processing module is configured to, during a process of data unit replacement, perform a replacement operation on the N data units according to the patterns configured by the configuring module.

Figure 9:
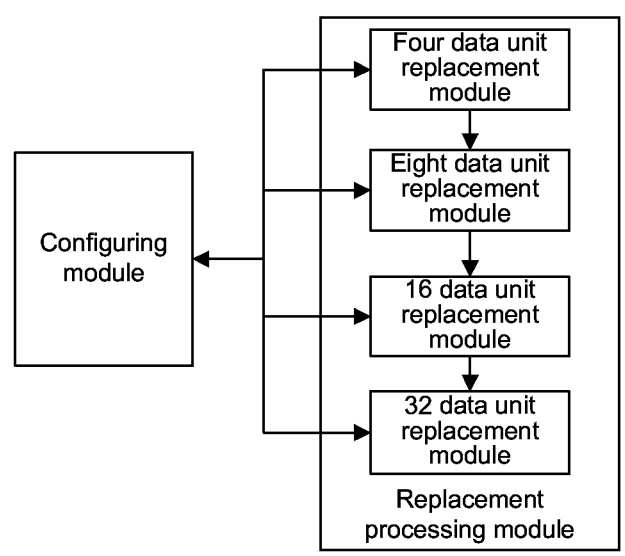
FIG. 9 is a schematic structural diagram of a device of supporting arbitrary replacement of 32 data units according to an embodiment of the disclosure.

The device of the disclosure is elaborated below by taking N=32 as an example. As shown in FIG. 9, the device includes a configuring module and a replacement processing module.

The configuring module is configured to configure patterns for arbitrary position replacement of 32 data units; and the replacement processing module is configured to, during a process of data unit replacement, perform the following replacement operations successively on the 32 data units according to the patterns configured by the configuring module: a replacement operation of four data units, a replacement operation of eight data units, a replacement operation of 16 data units, and a replacement operation of 32 data units on the 32 data units.

In the disclosure, the configuring module can either be implemented by software or be implemented by hardware. Of course, the configuring module is preferably implemented by software, which can decrease an occupied area of the device in a chip.

The replacement processing module includes a four data unit replacement module, an eight data unit replacement module, a 16 data unit replacement module, and a 32 data unit replacement module.

The four data unit replacement module is configured to perform the replacement operation of four data units on the 32 data units according to the patterns configured by the configuring module, and send a replacement result to the eight data unit replacement module;

the eight data unit replacement module is configured to perform the replacement operation of eight data units on 32 data units sent by the four data unit replacement module according to the patterns configured by the configuring module, and send a replacement result to the 16 data unit replacement module;

the 16 data unit replacement module is configured to perform the replacement operation of 16 data units on 32 data units sent by the eight data unit replacement module according to the patterns configured by the configuring module, and send a replacement result to the 32 data unit replacement module; and the 32 data unit replacement module is configured to perform the replacement operation of 32 data units on 32 data units sent by the 16 data unit replacement module according to the patterns configured by the configuring module.

The solution of the disclosure can be extensively used to arbitrary position replacement of vector data units in a vector processor or arbitrary position replacement of parallel multiple data units in other applications.

The above are only preferable embodiments of the disclosure, which are not intended to limit the scope of protection of the disclosure.

The invention claimed is:

1. A method of supporting arbitrary replacement of multiple data units, which comprises configuring patterns for arbitrary position replacement of N data, the method further comprising:

during a process of data replacement, performing a replacement operation on the N data according to the configured patterns;

wherein N denotes a number of the data and is equal to $2^m$, and m is a positive integer;

when N is 32, further comprising:

configuring patterns for arbitrary position replacement of 32 data; during a process of data replacement, performing the following replacement operations successively on the 32 data according to the configured patterns: a replacement operation of four data, a replacement operation of eight data, a replacement operation of 16 data, and a replacement operation of 32 data; wherein the replacement operation of four data is controlled by 3 stage cross selector, the replacement operation of eight data is controlled by 3 stage cross selector, the replacement operation of 16 data is controlled by 4 stage cross selector, the replacement operation of 32 data is controlled by 5 stage cross selector;

performing 3+3+4+5=15 stage replacement and supporting 32! replacement;

wherein the configured patterns refer to position patterns of data after a process of arbitrary replacement to obtain control lines corresponding to cross selectors.

2. The method according to claim 1, wherein the step of performing a replacement operation of four data on the 32 data comprises:
dividing the 32 data into eight groups, wherein each group comprises four data; and
performing a replacement operation on the four data of the respective group respectively.

3. The method according to claim 1, wherein the step of performing a replacement operation of eight data on the 32 data comprises:
performing a pairwise combination on eight groups of data on which the replacement operation of four data is performed, to generate four groups of sequences of eight data; and
performing the replacement operation of eight data on the four groups of data sequences respectively according to the configured patterns.

4. The method according to claim 1, wherein the step of performing a replacement operation of 16 data on the 32 data comprises:
performing a pairwise combination on four groups of data on which the replacement operation of eight data is performed, to generate two groups of sequences of 16 data; and
performing the replacement operation of 16 data on the two groups of data sequences respectively according to the configured patterns.

5. The method according to claim 1, wherein the step of performing a replacement operation of 32 data on the 32 data comprises:
combining two groups of data on which the replacement operation of 16 data is performed, to generate one group of a 32 data sequence; and
performing the replacement operation of 32 data on the group of data sequence according to the configured patterns.

6. A device of supporting arbitrary replacement of multiple data, the device comprising a configuring module and a replacement processing module, wherein
the configuring module is configured to configure patterns for arbitrary position replacement of N data; and
the replacement processing module is configured to, during a process of data replacement, perform a replacement operation on the N data according to the patterns configured by the configuring module;
wherein N denotes a number of the data and is equal to $2^m$, and m is a positive integer;
when N is 32, the configuring module is configured to configure patterns for arbitrary position replacement of 32 data; and the replacement processing module is configured to, during a process of data replacement, perform the following replacement operations successively on the 32 data according to the patterns configured by the configuring module: a replacement operation of four data, a replacement operation of eight data, a replacement operation of 16 data, and a replacement operation of 32 data; wherein the replacement operation of four data is controlled by 3 stage cross selector, the replacement operation of eight data is controlled by 3 stage cross selector, the replacement operation of 16 data is controlled by 4 stage cross selector, the replacement operation of 32 data is controlled by 5 stage cross selector; and the replacement processing module is configured to perform 3+3+4+5=15 stage replacement and support 32! replacement;
wherein the configured patterns refer to position patterns of data after a process of arbitrary replacement to obtain control lines corresponding to cross selectors generated by the configuring module for the replacement processing module.

7. The device according to claim 6, wherein the replacement processing module comprises: a four data replacement module, an eight data replacement module, a 16 data replacement module, and a 32 data replacement module, wherein
the four data replacement module is configured to perform the replacement operation of four data on the 32 data according to the patterns configured by the configuring module, and send a replacement result to the eight data replacement module;
the eight data replacement module is configured to perform the replacement operation of eight data on 32 data sent by the four data replacement module according to the patterns configured by the configuring module, and send a replacement result to the 16 data replacement module;
the 16 data replacement module is configured to perform the replacement operation of 16 data on 32 data sent by the eight data replacement module according to the patterns configured by the configuring module, and send a replacement result to the 32 data replacement module; and
the 32 data replacement module is configured to perform the replacement operation of 32 data on 32 data sent by the 16 data replacement module according to the patterns configured by the configuring module.

* * * * *